(12) United States Patent
Peterson

(10) Patent No.: US 6,814,639 B1
(45) Date of Patent: Nov. 9, 2004

(54) AIR VALVE

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/461,647

(22) Filed: Jun. 13, 2003

(51) Int. Cl.$^7$ ............................................. B63R 35/58
(52) U.S. Cl. .......................................... 441/41; 441/90
(58) Field of Search ........................... 137/232; 441/41, 441/90–101

(56) References Cited

U.S. PATENT DOCUMENTS

| | | | | | |
|---|---|---|---|---|---|
| 4,924,899 | A | * | 5/1990 | Po | ............................... 137/232 |
| 5,119,842 | A | * | 6/1992 | Jaw | ............................... 137/232 |
| 6,164,314 | A | * | 12/2000 | Saputo et al. | ................ 137/232 |
| 6,196,254 | B1 | * | 3/2001 | Shaw | ......................... 137/231 |

* cited by examiner

*Primary Examiner*—Ed Swinehart
(74) *Attorney, Agent, or Firm*—Sturm & Fix LLP

(57) ABSTRACT

The present invention includes an air valve having a housing sealed to an inflatable device. The housing includes an opening that matingly receives a check valve with an inner surface defining a passageway. A cap is in turn matingly received in the passageway of the check valve. The housing, check valve, and cap are all attached to and interconnected by a tether. During the inflation process, the check valve is positioned in the opening in the housing and a source of pressurized air is delivered to the check valve until the desired degree of inflation is achieved, at which time the cap is inserted in the passageway of the check valve. To deflate the device, the end of the tether is pulled up which acts to sequentially pull the cap free from the passageway of the check valve and pull the check valve free from the opening in the housing.

9 Claims, 1 Drawing Sheet

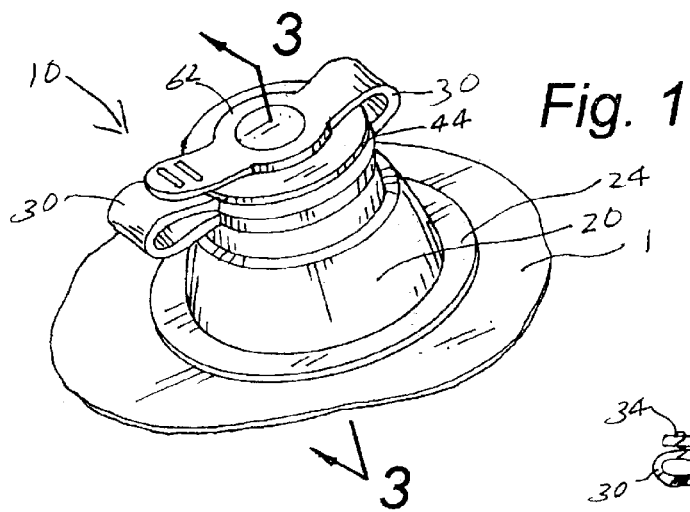
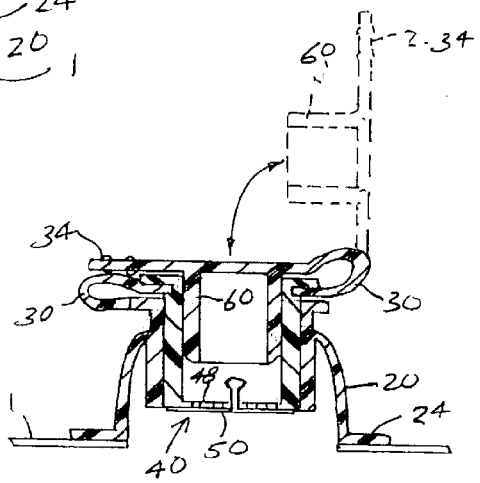
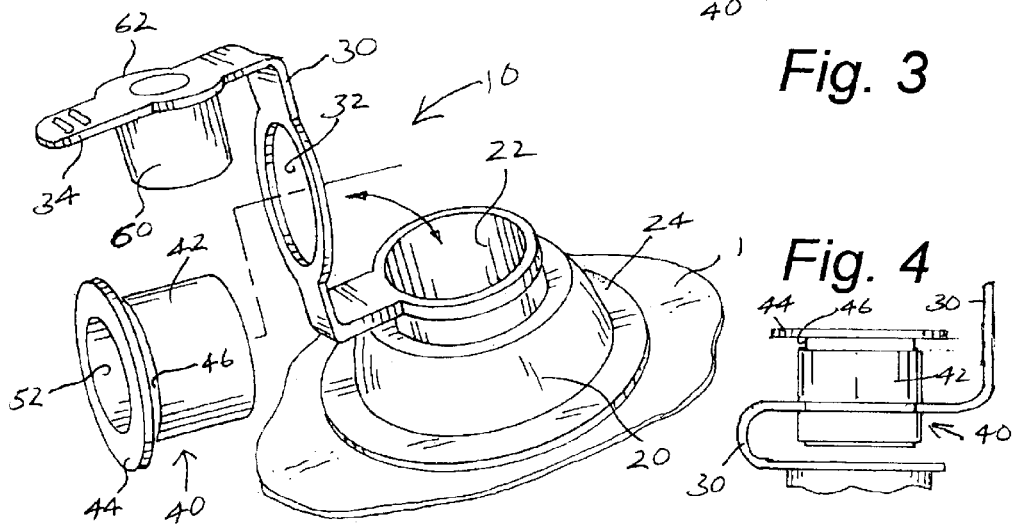
Fig. 1
Fig. 3
Fig. 4
Fig. 2

AIR VALVE

BACKGROUND OF THE INVENTION

1. Field of the Invention

The present invention relates to the field of valves, and more particularly to an air valve for an inflatable device.

2. Description of Related Art

Prior art air valves are uniformly deficient with respect to their failure to provide a simple, efficient, and practical air valve for inflatable devices such as towables, swimming pools, and floatation devices.

As a consequence of the foregoing situation, there has existed a longstanding need for a new and improved air valve, and the provision of such a construction is a stated objective of the present invention.

BRIEF SUMMARY OF THE INVENTION

Briefly stated, the present invention provides an air valve having a housing sealed to an inflatable device. The housing includes an opening that matingly receives a check valve with an inner surface defining a passageway. A cap is in turn matingly received in the passageway of the check valve. The housing, check valve, and cap are all attached to and interconnected by a tether. During the inflation process, the check valve is positioned in the opening in the housing and a source of pressurized air is delivered to the check valve until the desired degree of inflation is achieved, at which time the cap is inserted in the passageway of the check valve. To deflate the device, the end of the tether is pulled up which acts to sequentially pull the cap free from the passageway of the check valve and pull the check valve free from the opening in the housing.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the air valve of the present invention in the configuration after inflation is complete;

FIG. 2 is an exploded perspective view of the air valve in the configuration when deflation is desired;

FIG. 3 is a sectional view taken along line 3—3 of FIG. 1, with a dashed line showing of the cap retracted to allow pressurized air to be delivered through the check valve; and FIG. 4 is a partial side elevational view illustrating the attachment of the check valve to the tether.

DETAILED DESCRIPTION OF THE INVENTION

As can be seen by reference to the drawings, and in particular to FIG. 1, the air valve that forms the basis of the present invention is designated generally by the reference number 10.

The air valve 10 includes a housing 20 with an opening 22 extending between the upper and lower ends, and a rim 24 extending out from the lower end that is sealingly attached to an inflatable device 1. A tether 30 is attached to and extends out from the upper end of the housing 20. An opening 32 in the tether 30 receives a check valve 40, and a cap 60 with a collar 62 is carried near the free end 34 of the tether 30.

The check valve 40 has a body member 42, a flange 44 extending out from the upper end of the body member 42, a groove 46 adjacent and below the flange 44, a perforated plate 48 at the lower end, and a back pressure ring 50 (FIG. 3) that selectively engages the perforated plate 48 to prevent pressurized air from exiting the inflatable device 1. A passageway 52 is defined by the inner surface of the body member 40. The groove 46 of the check valve 40 receives the portion of the tether 30 adjacent the opening 32 as illustrated in FIGS. 2 and 4. The outer surface of the body member 40 is matingly received in the opening 22 of the housing 20 as illustrated in FIG. 3. Although the check valve 40 illustrated is of the type know as a "Boston" valve, it is to be understood that other types of check valves can be used.

In use, the air valve 10 is secured to the inflatable device I by sealing the rim 24 of the housing 20 to a wall of the inflatable device 1. The check valve 40 is then attached to the tether 30 as illustrated in FIGS. 2 and 4, and the outer surface of the body member 42 is inserted into the opening 22 in the housing 20. Pressurized air is then delivered through the check valve 40 until the desired inflation is achieved. The cap 60 is then inserted into the passageway 52 of the valve 40 to minimize leakage from the inflated device 1. Deflation is accomplished by simply pulling on the free end 34 of the tether 30 which acts to sequentially pull the cap 60 free from the passageway 52 in the check valve 40, and pull the body member 42 free from the opening 22 in the housing 20.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An air valve for an inflatable device, comprising:
   a housing having an upper end, a lower end, and an opening extending between the upper and lower ends, the lower end being sealingly attached to the inflatable device;
   a check valve having a body member with an upper end, a lower end, an outer surface disposed to be selectively matingly received in the opening of the housing, and an inner surface defining a passageway; and
   a cap having an upper end, a lower end, and an outer surface disposed to be selectively matingly received in the passageway of the check valve wherein the check valve includes a perforated plate disposed at the lower end of the body member, and a back pressure ring disposed to selectively engage the plate when pressure within the inflatable device exceeds pressure applied from outside the inflatable device.

2. The air valve of claim 1 wherein the housing includes a rim extending out from the lower end of the housing, and wherein the rim is sealingly attached to the inflatable device.

3. The air valve of claim 1 wherein the body member of the check valve includes a flange extending out from the outer surface of the body member adjacent the upper end.

4. The air valve of claim 1 wherein the cap includes a collar extending out from the outer surface of the cap adjacent the upper end.

5. The air valve of claim 1 further including a tether attached to and interconnecting the housing, the check valve, and the cap.

6. The air valve of claim 5 wherein, the body member of the check valve includes a groove disposed adjacent the flange, and wherein the tether includes an opening disposed to receive the outer surface of the check valve, with a portion of the tether adjacent the opening being disposed to be received in the groove.

7. An air valve for an inflatable device comprising:

a housing having an upper end, a lower end, and a first opening extending between the upper and lower ends, the lower end being sealingly attached to the inflatable device wherein the housing is further provided with an elongated tether;

a cap disposed on the outboard end of the tether and a second opening disposed on the tether intermediate said cap and said housing wherein the cap has an upper end, a lower end and an outer surface; and a check valve having a body member with an upper end, a lower end, and an outer surface dimensioned to be matingly received in both said first and second openings, and further having an inner surface defining a passageway.

8. The air valve as in claim 7 wherein the outer surface of the cap is dimensioned to be matingly received in the passageway of the check valve.

9. The air valve as in claim 8 wherein said first and second openings are approximately the same size.

\* \* \* \* \*